July 29, 1941.                R. G. DE LA MATER                2,250,626
                            WALKING BEAM ASSEMBLY
                            Filed Jan. 28, 1939            2 Sheets-Sheet 1
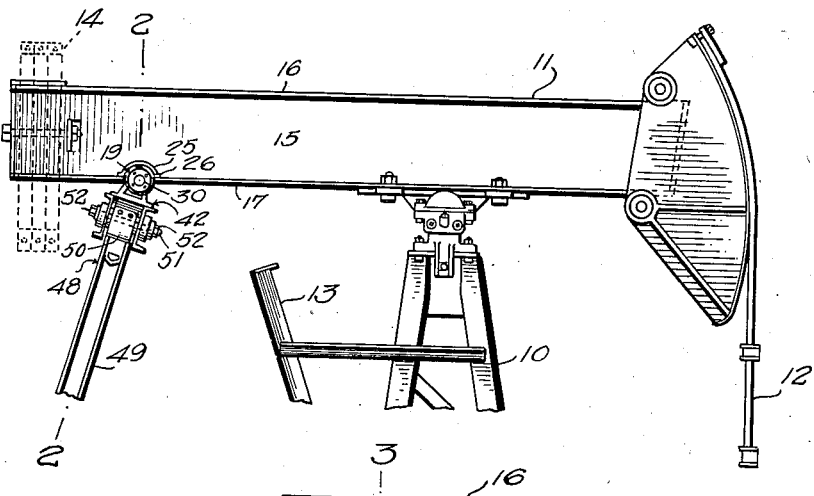
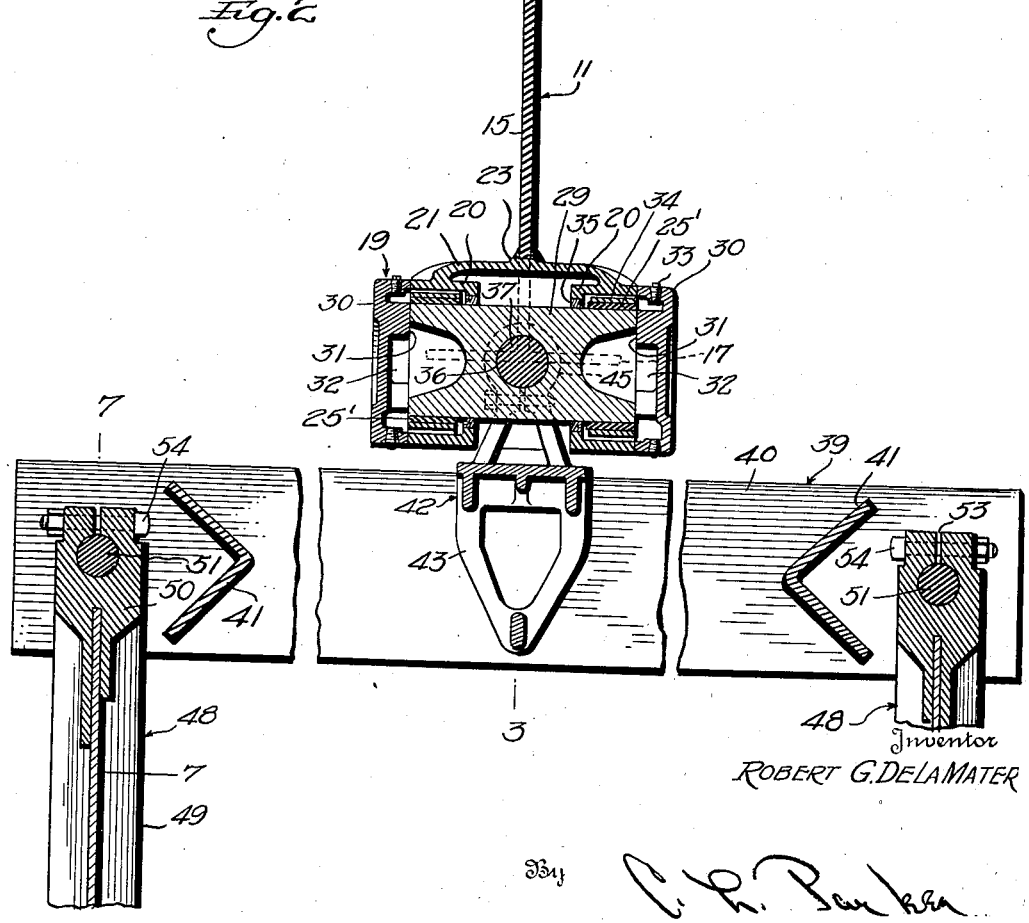
Inventor
ROBERT G. DE LA MATER

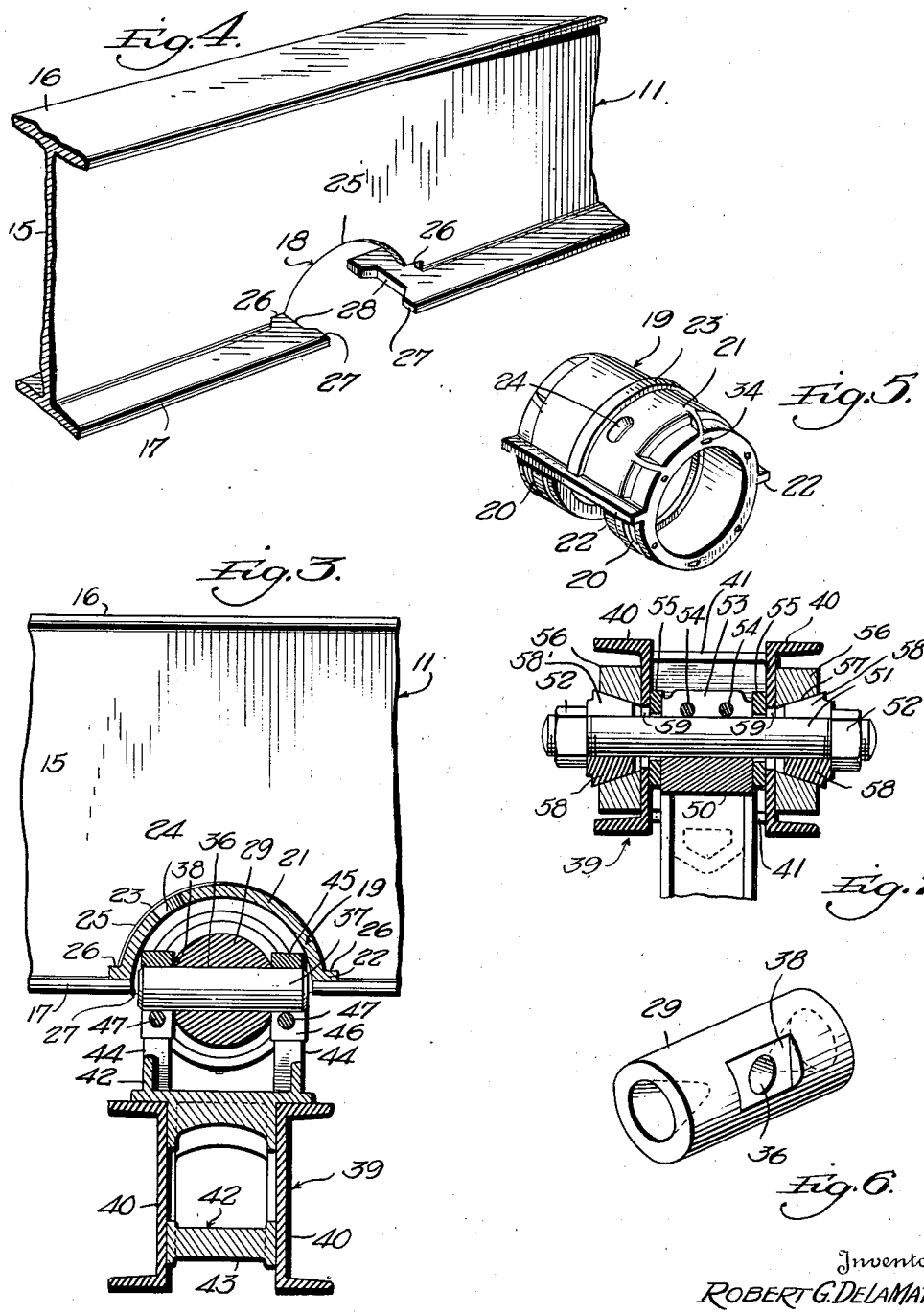

Patented July 29, 1941

2,250,626

UNITED STATES PATENT OFFICE 2,250,626

WALKING BEAM ASSEMBLY

Robert Griffin De La Mater, Parkersburg, W. Va., assignor to The Parkersburg Rig & Reel Company, Parkersburg, W. Va., a corporation of West Virginia Application January 28, 1939, Serial No. 253,431

16 Claims. (Cl. 74—41)

This invention relates to walking beam assemblies and method of making the same.

Heretofore it has been the common practice in the making of walking beam assemblies for oil well pumping apparatus to mount the bearing at the upper end of the pitman above the upper flange or below the lower flange of the walking beam and to bolt or weld it in position. In either case, the load must be carried to the beam through the bolts or the weld through which the bearing is secured to the beam. Since the bearing is attached only to the flange the stress from the load transmitted directly to the flange must be distributed throughout the beam section. This construction results in the concentration of stresses in the beam flange.

When bearings are bolted to the walking beam the bolts are a constant source of trouble. The bolts are subjected to continuous shock loads and frequently fail from fatigue. Moreover, since the operator frequently is an unskilled mechanic, he may over-stress the bolts in an effort to keep them tight. Whether a pitman bearing is bolted or welded to the beam in accordance with prior practice, there is a concentration of stresses in the flange of the walking beam, as stated, and failure of the attachment bolts or weld can result in a complete wrecking of the unit.

With prior structures it will also be apparent that the center of the bearing referred to is necessarily located an appreciable distance out of the plane of the flange to which the bearing is secured, and consequently there is a tendency of the component of pitman loads along the beam to cause the bearing to work loose. This effect in prior structures is quite appreciable.

An important object of the present invention is to provide a method of making walking beam assemblies wherein the beam and bearing are so formed and assembled with respect to each other as to eliminate concentration of stresses in one flange of the walking beam.

A further object is to provide a method of the character referred to wherein one edge, preferably the lower edge, of the walking beam is cut transversely to form a recess corresponding in contour to the contour of the bearing, and to weld the bearing in position in the recess in the walking beam in such a manner that stresses are distributed throughout the beam section.

A further object is to provide a method of the character referred to which permits the welding of the bearing not only to one flange of the walking beam but also to the web thereof, thus providing a uniform distribution of stresses throughout the beam section.

A further object is to provide a beam assembly wherein the center of the pitman bearing connected to the beam is arranged approximately in the plane of one flange of the beam, thus eliminating any tendency of the components of the pitman loads along the beam to cause the bearing to work loose.

A further object is to provide a structure of the character referred to wherein the pitman bearing is arranged in a recess in the walking beam the edges of which are shaped to coincide with and substantially fit the adjacent surfaces of the bearing, and wherein such portions of the beam and bearing are welded throughout the length of the edge which forms the recess in the beam to provide a highly effective shock-proof connection between the bearing and the beam.

A further object is to provide such a structure wherein a portion of the recess in the beam is undercut to form, in effect, a keyed connection between the bearing and the walking beam, and wherein the welding of the bearing to the beam forms these elements into an integral assembly.

A further object is to provide such a structure wherein the pitman bearing embodies novel self-aligning means to compensate for any misalignment of the parts.

A further object is to provide a walking beam and pitman bearing assembly which is readily adapted for use with either single crank or twin crank pumping units.

A further object is to provide an assembly of this character employing a pitman cross-yoke for use with twin crank units having novel swivel means for connecting the cross-yoke to each of the pitmans in such a manner as to compensate for irregularity in operation due to misalignment of the parts.

A further object is to provide such a construction which is highly effective in compensating for misalignment and which also permits the swinging of the pitman connection when it is desired to disconnect the pitman from the wrist pin.

A further object is to provide such an assembly employing a novel construction and arrangement of tapered bushings and associated parts which provide for the necessary close but moving fit, and which are operative for eliminating side slap, while being readily adjustable to compensate for wear.

Other objects and advantages of the invention will become apparent during the course of the following description.

In the drawings I have shown an apparatus constructed in accordance with the present method. In this showing:

Figure 1 is a side elevation of the upper portion of a pumping unit showing the invention applied, Figure 2 is an enlarged detailed sectional view on line 2—2 of Figure 1, Figure 3 is a similar view on line 3—3 of Figure 2, Figure 4 is a detailed fragmentary perspective of a portion of the walking beam showing the recess formed therein for receiving the bearing housing, Figure 5 is a detailed perspective view of the bearing housing, Figure 6 is a similar view of the journal, and Figure 7 is a detailed sectional view on line 7—7 of Figure 2.

Referring to Figure 1, the numeral 10 designates a conventional Samson post above which is arranged a walking beam 11 pivotally supported for rocking movement by the Samson post for operating the usual polished rods 12. The pumping unit includes the usual headache post 13 and the beam may be counterweighted as at 14.

Referring to Figure 4, the walking beam 11 is shown as being of the usual I-beam section including a web 15 and upper and lower flanges 16 and 17. In accordance with the present invention the lower edge portion of the walking beam is cut or otherwise recessed as at 18 to receive a bearing indicated as a whole by the numeral 19, as will be described in detail later. The bearing 19 is preferably formed of a pair of end housing sections 20 having their adjacent ends spaced apart a substantial distance as shown in Figures 2 and 5. These housing sections are integrally joined by a wall 21 of semi-circular cross-section as shown in Figure 3 and this wall has also formed integral therewith opposite outstanding flanges 22 extending lengthwise of the bearing substantially throughout the length thereof. The wall 21 also preferably includes an integral arcuate reinforcing portion 23, and the wall 21, to one side of the reinforcement 23, is preferably provided with an opening 24 for a purpose to be described. The bearing housing sections 20 are provided with any suitable bearing means such as bushings 25' (Figure 2).

The recess 18 is formed in contour to correspond to the contour of the bearing 19 in a plane transverse to the axis of the bearing and passing through the reinforcement 23. Such portion of the wall 21 of the bearing being substantially semi-circular, the upper portion of the recess 18 which is formed in the web 15 is likewise substantially semi-circular as indicated by the numeral 25. Above the flange 17, the recess 18 is provided with undercuts 26 corresponding in shape and size to and adapted to receive the flanges 22 of the bearing 19. The recess 18 is formed by cutting through the web 15 and also by cutting through the flange 17 to provide opposite spaced edges 27, such edges projecting beneath and supporting the respective bearing flanges 22. Each edge 27 is cut back centrally thereof as at 28 for a purpose to be described.

A journal in the form of a relatively heavy shaft or pin 29 is arranged to rock in the bushings 25' and preferably is of a length equal to the length of the bearing 19. The remote ends of the housing sections 20 are provided with caps 30 secured thereto in any suitable manner and each is preferably provided with machined thrust surfaces 31 engaging the adjacent end of the journal 29 to hold the latter in proper endwise position. Each cap 30 is provided with a space 32 therein adapted to contain a lubricant introduced thereinto through plugged openings 33. The lubricant is directly supplied to the outer ends of the bushings 25' and the inner ends of the bushings are supplied with lubricant through suitable passages 34. The inner end of each housing 20 is provided with an oil sealing ring 35.

The journal 29 is provided with a transverse opening 36 perpendicular to and in a common plane with the axis of the journal, as shown in Figures 2 and 3. A pin 37 is arranged in this opening and projects beyond opposite sides of the journal, the journal adjacent the ends of the opening 36 being cut away to form flat surfaces 38 as clearly shown in Figure 6.

Referring to Figures 2 and 3 the numeral 39 designates a pitman cross-yoke as a whole formed of a pair of channeled sections 40 having their flanges turned outwardly, and the end portions of the channeled sections 40 are fixed with respect to each other by spacers 41. A pitman yoke 42 is arranged intermediate the ends of the cross-yoke 39 and includes a depending portion 43 of a width equal to the space between the channeled sections 40 and welded or otherwise secured to the inner faces of the webs thereof. The yoke 42 further comprises a pair of spaced upstanding arms 44 having collars 45 at their upper ends split as at 46. These collars receive the ends of the pin 37 with their inner faces in engagement with the flat faces 38 of the journal as shown in Figure 3. A bolt 47 is adapted to clamp each collar about the adjacent end of the pin 37.

Each end of the cross-yoke 39 is adapted to be connected to one of the operating cranks by a suitable pitman indicated as a whole by the numeral 48. Each of these pitmans comprises a pitman stem 49 having a head 50 at its upper end arranged between the channeled sections 40 as shown in Figure 7. A pin 51 projects through each head 50 and through the ends of the sections 40 and is threaded at each end to receive a nut 52. Each head 50 is split as at 53 and is provided with bolts 54 whereby it may be clamped into engagement with the associated pin 51. A spacer 55 is arranged between each end of each head 50 and the adjacent channeled section 40.

Each channeled section 40 is provided in axial alignment with the pin 51 with a block 56 having a conical opening 57 to receive a tapered bushing 58 split as at 58', it being noted that the pins 51 project through enlarged openings 59 in each of the channeled sections 40, and accordingly the pins are not in direct contact with such sections. The nuts 52 are tightened to provide a close but moving fit between the tapered bushings and the pins 51 and between the bushings and the conical openings 57. This operation also moves the adjacent ends of the channeled sections 40 inwardly sufficiently to take up all side play between the parts to eliminate side slap. This arrangement also compensates for any slight warpage or misalignment of the two sections of the cross-yoke.

The operation of the apparatus is as follows:

In the practice of the method, the walking beam is cut as indicated in Figure 4 to form the recess 18, preferably in the lower edge of the beam. The semi-circular portion 25 of the recess 18 has its ends undercut as at 26 just above the top plane of the flange 17, and this flange has its edges 27 projecting inwardly beyond the limits of the semi-circular portion of the recess, as will be clear in Figures 3 and 4. The edges 27 are cut away to a slight extent as at 28 to provide clearance for the ends of the pin 37 when the apparatus is in operation.

It will be apparent that the recess 18 corresponds in contour to the contour of the bearing housing around the reinforcing flange 23. In other words, the flange 23 will approximately exactly fit the semi-circular portion 25 of the recess 18 and the extended flanges 22 of the bearing housing will substantially exactly fit the recesses 26 with the flanges 22 lying flat against the top of the walking beam flange 17.

Under the circumstances, it will be apparent that after the recess 18 has been formed, the bearing housing 19 can be inserted into the recess endwise with respect to the bearing housing and laterally with respect to the walking beam. With the bearing housing 19 arranged with the reinforcing flange coincident with the arcuate portion 25 of the recess 18, the bearing housing will be supported with its axis perpendicular to the web 15 of the walking beam, whereupon the bearing housing and the walking beam will be welded to each other. The weld will extend around the semi-circular recess portion 25 and around the recessed extensions 26, and the flanges 22 of the bearing housing will be welded to the walking beam flange 17 throughout the width thereof.

The parts of the apparatus are now ready to be assembled. The journal 29 is inserted through one end of the bearing housing, whereupon the caps 30 are placed in position to prevent endwise movement of the journal. With the journal inclined from the position shown in Figure 3 so that a theoretical extension of one end of the cylindrical opening 36 will clear the edge of the walking beam flange 17 formed by the recess 28, the yoke arms 44 are held in a position with the openings in the collars 45 aligned with the opening 36. The pin 37 then may be inserted through the lower of the two collars 45, such collar having its opening in alignment with the end of the opening 36 which is inclined downwardly. The journal 29 is then swung back to the position shown in Figure 5, whereupon the bolts 47 are tightened to clamp the arms 44 to the pin 37, this pin being adapted to rock in the opening 36 under conditions to be described.

In assembling the parts shown in Figure 7, the pin 51, with the nuts 52 removed therefrom, is inserted through the structure before the split bushings 58 are placed in position. With the bolts 54 loosened the pin 51 will readily slide through the head 50 and the size of the openings 59 obviously is such as to permit the pin to be freely moved therethrough.

After placing the pin 51 in position, the operator will slide the split bushings 58 over the ends of the pin 51 and then apply and tighten the nuts 52. The taper of each bushing and its associated opening 57 is relatively steep to eliminate a tight wedging of the bushings in their openings and to permit the bushings to be easily removed, when desired. The nuts 52 are tightened to provide a snug but moving fit between the bushings and the pin 51 and between the bushings and the conical openings 57. The tightening of the nuts obviously tends to move the adjacent portions of the cross-yoke sections 40 toward each other, thus taking up lateral play between the parts and effectively eliminating lateral slap in the operation of the apparatus.

With the parts completely assembled, the apparatus is operated in accordance with the conventional practice. The prime mover drives the cranks (not shown) to which the lower ends of the pitmans are connected, and thus rocking movement is imparted to the walking beam to vertically reciprocate the polished rods 12. Assuming that there is no warpage or misalignment present in the parts, the pitmans and the cross-yoke 39 will move as a unit with the yoke 42 transmitting movement to the walking beam through the pins 37 and journal 29. The pin 37, if there is no warpage or misalignment, will not rock in its opening 36, but the journal 29 obviously will rock in the bushings 25' during rocking movement of the walking beam.

If any warpage or misalignment of parts is present, the apparatus provides compensating means therefor at three different points, thus providing a perfect working unit. The cross-yoke 29 under such conditions must assume positions out of parallelism with the journal 29, such action being permitted by the rocking of the pin 37 in the opening 36 (Figure 2). Moreover warpage and misalignment is compensated for in the means connecting the cross-yoke 39 to each pitman head 50. As previously stated, the nuts 52 are tightened to provide a snug but moving fit between each bushing 58 and its associated pin 51 and conical opening 57. Thus, instead of moving as a perfect rigid unit, the elements of the pitman assembly may alter their relative positions with respect to each other by the rocking of either or both of the pins 52. Each of these pins is adapted to rock in its bushing 58 and each bushing is adapted to rock in its opening 57. The nuts 52 are tightened in accordance with the judgment of the operator and the degree of taper of the bushings and their openings is such as to minimize the possibility of any binding of the parts.

In prior swivel connections it has been a difficult problem to prevent the connections from working or pounding loose with a resulting knock in operation. Such connections are only required to compensate for misalignment and to permit swinging of the pitman stem outwardly when disconnecting the pitman from the wrist pin of the crank. Limited space and cost frequently prevent providing pins of ample size so that the bearing area would be adequate to properly minimize wearing. Moreover, such connections usually are not readily accessible and are frequently neglected, and accordingly they have been a continuous source of annoyance and trouble.

In the present construction, the split bushing at the upper end of each pitman stem can be clamped to the swivel pin by the bolts 54 and the load is evenly placed on opposite ends of the pin through bearing surfaces of substantial areas, namely, the surfaces between the bushings 58 and pins 51 and the contacting surfaces of the bushings and their conical openings 57. If there is excessive clearance between the cross-yoke channels 40 and the ends of the collar 50 there will be a side slap for each rotation of the crank. The taper of the bushings in the present construction is so designed that in tightening the nuts 52 the channel sections of the yoke are drawn toward each other to eliminate play but are not drawn inwardly so tightly as to bind or lock.

Thus it will be apparent that the split tapered bushing arrangement serves three purposes. They provide for a close or moving fit with the pins 51 and with the conical openings 57 and they provide for taking side slap out of the assembly. If, after long periods of use some wear or looseness develops, this can be taken up by proper adjustment of the nuts 52. Moreover, this arrangement is ideal in that it compensates for any slight warpage or misalignment of the two sections of the cross-yoke. It will be appreciated that if a straight pin and a straight opening therefor were used in the assembly, and especially if the openings were long enough to provide ample wearing surfaces to minimize wear and looseness and with a close enough fit to minimize knock it would be extremely difficult to assemble the pin if any warpage of the cross-yoke sections were present. Even if such warpage is present, the arrangement shown permits the easy assembly of the parts in the manner described. Tightening of the nuts 52 will either draw the yoke elements into alignment or if warpage is too great will at least result in the tapered bushing finding sufficient fit in the tapered openings 57 to provide a movable but rattle-free connection. This is particularly important in the case of welded cross-yokes made up of rolled structural members wherein the mill tolerances of the members cause some inaccuracies and where welding may cause some warpage or distortion.

The journal 29 has a considerably larger diameter than is generally employed. Although the journal could be made of steel its large diameter permits it to be made of a suitable analysis of cast iron which has been found particularly suitable for use with bronze bushings with a resultant low coefficient of friction and long wear life. The large diameter of the journal 29 permits employing the method referred to for attaching the pitman assembly and without sacrificing strength. It is well known of course, that cast iron parts, if adequately proportioned are more resistant to fatigue from shock loads than steel and the present construction permits the use of a cast iron trunnion or journal which is directly subjected to shock loads. The large diameter referred to and the relatively short bearing also keep the over-all length of the bearing within the practical limits of the width of the walking beam flange. While the construction has been shown for use with a twin crank unit employing two pitmans, it is obvious that the pitman yoke 42 is readily attachable to the upper end of the pitman of a single crank unit. In other words, the units comprising the two pitmans 48 and the cross-yoke 39 may be considered as a pitman unit which may include either a pair of pitmans or a single pitman. Where the apparatus is used in connection with a single pitman it will be apparent that the pin 37 serves the function not only of compensating for misalignment but also provides for swinging the pitman stem away from the crank when it is necessary to disconnect the pitman from the wrist pin.

The mode of assembling the pin 37 and the associated parts with respect to the walking beam has been previously described. The parts may be just as readily disassembled. When it is desired to remove the pin 37 the yoke 42 may be swung in a clockwise direction from the position shown in Figure 3 until the lower end of the pin 37 clears the lower flange of the walking beam. Assuming that the bolts 47 have been loosened, the operator may insert a suitable implement through the opening 24 and knock out the pin 37. While the opening 24 is arranged to one side of the reinforcing flange 23, Figure 5, the adjacent end of the pin 37 readily may be reached through the opening 24 under the conditions referred to.

While I have disclosed the preferred practice of the method and the preferred embodiment of the apparatus, it is to be understood that the details of procedure of the method and the shape, size and arrangement of parts of the apparatus may be variously modified without departing from the spirit of the invention or the scope of the subjoined claims.

I claim:

1. A walking beam assembly comprising a walking beam having a recess formed in one edge portion thereof, a bearing housing rigidly mounted in said recess with its axis extending transversely of the walking beam, said housing comprising a pair of aligned spaced bearings, a single journal mounted in said bearings for rocking movement therein, a pitman connection extending between said bearings and connected to said journal, and a pivot pin connecting said pitman connection to said journal perpendicular to to the axis thereof.

2. A walking beam assembly comprising a flanged and webbed walking beam having a recess formed transversely through a flange portion and a web portion thereof in one longitudinal edge portion thereof, a bearing housing having a transverse contour corresponding to a portion of the transverse contour of said recess and arranged therein with its axis arranged transversely of the beam, said bearing housing being welded to the beam throughout the extent of said recess, and a pitman connection pivotally connected with respect to said bearing.

3. A walking beam assembly comprising a flanged and webbed walking beam having a recess formed transversely through a flange portion and a web portion thereof in one longitudinal edge portion thereof, a bearing housing having a transverse contour corresponding to a portion of the transverse contour of said recess and arranged therein with its axis arranged transversely of the beam, said bearing housing being welded to the beam throughout the extent of said recess, a journal mounted to rock in said bearing housing, and a pitman connection connected to said journal.

4. A walking beam assembly comprising a walking beam of I-beam section having a recess cut through one flange and the adjacent portion of the web thereof, a bearing housing having a pair of spaced aligned bearings and having a transverse contour substantially centrally of its length a substantial portion of which corresponds in shape and size to the contour of said recess, said bearing housing being arranged with its axis perpendicular to the web of said beam with the portion of the housing which corresponds in contour to said recess arranged therein and welded to the beam throughout the extent of said recess, a journal mounted to rock in said bearings, and a pitman connection extending between said bearings and connected to said journal.

5. A walking beam assembly comprising a walking beam of I-beam section having a recess cut through one flange and the adjacent portion of the web thereof, a bearing housing having a pair of spaced aligned bearings and having a transverse contour substantially centrally of its length a substantial portion of which corresponds in shape and size to the contour of said recess, said bearing housing being arranged with its axis perpendicular to the web of said beam with the portion of the housing which corresponds in contour to said recess arranged therein and welded to the beam throughout the extent of said recess, a journal mounted to rock in said bearings, a pitman connection having a pair of arms projecting between said bearings and straddling said journal, and a pin arranged transversely of said journal with its axis intersecting the axis of said journal, the ends of said pin being connected to said arms.

6. A walking beam assembly comprising a walking beam having a recess in one edge portion thereof, a bearing housing mounted in said recess with its axis extending transversely of the walking beam, a journal mounted to rock in said bearing housing, a pitman cross-yoke extending transversely of said walking beam, a connection carried by said cross-yoke and connected to said journal to partake of turning movement on an axis at right angles to the axis of said journal, a pitman for each end of said cross-yoke, and means connecting each pitman to its end of said cross-yoke for turning movement with respect thereto on an axis perpendicular to the axis of said journal.

7. A walking beam assembly comprising a walking beam having a recess formed in one edge portion thereof, a bearing housing having a portion corresponding in transverse contour to and arranged in said recess with its axis extending transversely of the walking beam, said housing being welded to said walking beam throughout the extent of said recess, a journal mounted in said bearing housing, a pitman mounting having a connection arranged adjacent said journal, and a pin extending through said journal intermediate the ends thereof and intersecting the axis thereof at right angles thereto, said pin being fixed to said pitman connection.

8. A walking beam assembly comprising a walking beam having a recess formed in one edge portion thereof, a bearing housing having a portion corresponding in transverse contour to and arranged in said recess with its axis extending transversely of the walking beam, said housing being welded to said walking beam throughout the extent of said recess, a journal mounted in said bearing housing, a pitman mounting comprising a cross-yoke extending transversely of said walking beam, a connection carried by said cross-yoke intermediate its ends, means for connecting said connection to said journal for turning movement on an axis perpendicular to the axis of said journal, and a pitman connected to each end of said cross-yoke.

9. A walking beam assembly comprising a walking beam having a recess formed in one edge portion thereof, a bearing housing having a portion corresponding in transverse contour to and arranged in said recess with its axis extending transversely of the walking beam, said housing being welded to said walking beam throughout the extent of said recess, a journal mounted in said bearing housing, a pitman mounting comprising a cross-yoke extending transversely of said walking beam, a connection carried by said cross-yoke intermediate its ends, means for connecting said connection to said journal for turning movement on an axis perpendicular to the axis of said journal, a pitman for each end of said cross-yoke, and means connecting each pitman to the adjacent end of said cross-yoke for turning movement on an axis perpendicular to the axis of said journal.

10. A walking beam assembly comprising a walking beam of I-beam section having a recess cut through one flange and the adjacent portion of the web thereof, a bearing housing having a pair of spaced aligned bearings and having a portion of its transverse contour substantially centrally of its length corresponding in shape and size to the contour of said recess, said bearing housing being welded in said recess with its axis perpendicular to the plane of the web of said beam and with said transverse plane of said housing substantially coincident with the plane of said web, a journal mounted to rock in said bearings, a pitman cross-yoke, a connection carried by said cross-yoke intermediate the ends thereof, a pin extending through said journal with its axis transverse to and in a common plane with the axis of said journal, said pin being fixed to said connection, and a pitman connected to each end of said cross-yoke.

11. A walking beam assembly comprising a walking beam of I-beam section having a recess cut through one flange and the adjacent portion of the web thereof, a bearing housing having a pair of spaced aligned bearings and having a portion of its transverse contour substantially centrally of its length corresponding in shape and size to the contour of said recess, said bearing housing being welded in said recess with its axis perpendicular to the plane of the web of said beam and with said transverse plane of said housing substantially coincident with the plane of said web, a journal mounted to rock in said bearings, a pitman cross-yoke, a connection carried by cross-yoke intermediate the ends thereof, a pin extending through said journal with its axis transverse to and in a common plane with the axis of said journal, said pin being fixed to said connection, a pitman for each end of said cross-yoke, and means connecting each pitman to the adjacent end of said cross-yoke to turn on an axis parallel to the axis of said pin.

12. A walking beam structure comprising a walking beam of I-beam section, and a bearing housing, said walking beam being cut through one flange and the web thereof to provide an opening having a contour corresponding in shape and size to a portion of the transverse contour of said bearing housing, said housing being arranged in said opening and welded to said beam with its axis arranged within the limits of the depth of said beam.

13. A walking beam structure comprising a walking beam of I-beam section, and a bearing housing, said walking beam being cut therethrough to provide an opening having a contour corresponding in shape and size to a portion of the transverse contour of said bearing housing, said housing being arranged in said opening and welded to said beam with its axis arranged approximately in the plane of one flange of the beam.

14. A walking beam structure comprising a walking beam of I-beam section cut through one flange and the adjacent portion of the web thereof to form a recess, a bearing housing having a transverse contour intermediate its ends corresponding in shape and size to a portion of the transverse contour of said recess and arranged therein, said housing being welded to said beam throughout the extent of said recess, the axis of said bearing housing being arranged approximately in the plane of said flange of said beam.

15. A walking beam structure comprising a walking beam of I-beam section, a bearing housing having opposite flanges extending longitudinally thereof and arranged in a plane parallel to and adjacent the axis of said bearing housing, said beam being cut to form a recess receiving and substantially fitting said bearing housing with the portions of said recess which receive the flanges of said housing each having one side thereof formed by said flange of said beam, said housing being welded to said beam throughout the extent of said recess with the flanges of said housing welded to said flange of the beam.

16. A walking beam structure comprising a walking beam of I-beam section having one flange and the web thereof cut to form a recess transversely of the beam, the portion of said recess in said web and adjacent the flange being wider than the portion of the recess in said flange, a bearing housing having a portion intermediate its length corresponding in transverse contour to said recess whereby said housing is adapted to be arranged in said recess with a portion thereof overhanging said flange within said recess, said housing being welded to said beam throughout the extent of said recess both to said web and to said flange.

ROBERT GRIFFIN DE LA MATER.